US012700165B2

(12) United States Patent
Vaidyanathan et al.

(10) Patent No.: US 12,700,165 B2
(45) Date of Patent: Aug. 4, 2026

(54) REAL-TIME NEURAL APPEARANCE MODELS

(71) Applicant: NVIDIA Corporation, Santa Clara, CA (US)

(72) Inventors: Karthik Vaidyanathan, Oakland, CA (US); Alex John Bauld Evans, London (GB); Jan Novák, Dobřichovice (CZ); Andrea Weidlich, Montreal (CA); Fabrice Pierre Armand Rousselle, Ostermundigen (CH); Aaron Eliot Lefohn, Kirkland, WA (US); Franz Petrik Clarberg, Lund (SE); Benedikt Bitterli, Kirkland, WA (US); Tizian Lucien Zeltner, Zürich (CH)

(73) Assignee: NVIDIA Corporation, Santa Clara, CA (US)

( * ) Notice: Subject to any disclaimer, the term of this patent is extended or adjusted under 35 U.S.C. 154(b) by 174 days.

(21) Appl. No.: 18/418,680

(22) Filed: Jan. 22, 2024

(65) Prior Publication Data

US 2024/0257437 A1 Aug. 1, 2024

Related U.S. Application Data

(60) Provisional application No. 63/481,997, filed on Jan. 27, 2023.

(51) Int. Cl.
| | |
|---|---|
| *G06T 15/06* | (2011.01) |
| *G06T 7/33* | (2017.01) |
| *G06T 7/40* | (2017.01) |
| *G06T 15/50* | (2011.01) |

(52) U.S. Cl.
CPC ................ *G06T 15/06* (2013.01); *G06T 7/33* (2017.01); *G06T 7/40* (2013.01); *G06T 15/506* (2013.01); *G06T 2207/20081* (2013.01); *G06T 2207/20084* (2013.01)

(58) Field of Classification Search
CPC .. G06T 15/06; G06T 7/33; G06T 7/40; G06T 15/506; G06T 2207/20081; G06T 2207/20084
See application file for complete search history.

(56) References Cited

U.S. PATENT DOCUMENTS

2023/0027890 A1* 1/2023 Zhao ...................... G06T 15/04

OTHER PUBLICATIONS

Fan et al. (NPL), "Neural Layered BRDFs," SIGGRAPH '22 (2022). (Year: 2022).*

(Continued)

*Primary Examiner* — Daniel F Hajnik
*Assistant Examiner* — Adeel Bash
(74) *Attorney, Agent, or Firm* — Leydig, Voit & Mayer, Ltd.

(57) ABSTRACT

Embodiments of the present disclosure relate to real-time neural appearance models. Using a neural decoder, scenes are rendered in real-time with complex material appearance previously reserved for offline use. Learned hierarchical textures representing the material properties are encoded as latent codes. When a ray is cast and intersects with geometry in the scene, the intersection point is mapped to one of the latent codes. The latent code is interpreted using neural decoders, which produce reflectance values and importance-sampled directions that can be used to determine a pixel color.

21 Claims, 14 Drawing Sheets

| Dust 101 |
|---|
| Stain 102 |

| Dielectric(s) 103 |
|---|
| Absorption 104 |
| Diffuse Reflection 106 |
| Ceramic 107 |

| Grease 111 |
|---|
| Dirt 112 |
| Metal 113 |

115

105

(56)          References Cited

OTHER PUBLICATIONS

Deschaintre et al. (NPL), "Single-Image SVBRDF Capture with a Rendering-Aware Deep Network," 2018 (Year: 2018).*

Muller et al. (NPL), "Neural Importance Sampling," 2019 (Year: 2019).*

Muller et al._2 (NPL), "Instant Neural Graphics Primitives with a Multiresolution Hash Encoding," 2022. (Year: 2022).*

Rusinkiewicz et al. (NPL), "A New Change of Variables for Efficient BRDF Representation," 1998 (Year: 1998).*

Sztrajman et al. (NPL), "Neural BRDF Representation and Importance Sampling," 2021. (Year: 2021).*

Thies et al. (NPL), "Deferred Neural Rendering (Neural Textures)," 2019. (Year: 2019).*

Yan et al. (NPL), 2016. (Year: 2016).*

Burley et al. (NPL), 2012 (Year: 2012).*

Nvidia Virtual GPU Software (NPL), 2022 (Year: 2022).*

Rainer, G., et al., "Neural BTF Compression and Interpolation," Eurographics 2019, vol. 38, No. 2.

Akenine-Moller, T., et al., "Improved Shader and Texture Level of Detail Using Ray Cones," Journal of Computer Graphics Techniques (JCGT) 10, 1 (Jan. 25, 2021), pp. 1-24.

Andersson, P., et al., "FLIP: A difference Evaluator for Alternating Images," Proceedings of the ACM on Computer Graphics and Interactive Techniques 3, 2 (2020), 15:1-15:23.

Baatz, H., et al., "NeRF-Tex: Neural Reflectance Field Textures," In Computer Graphics Forum 41, 2022, pp. 287-301.

Bai, Y., et al., "BSDF Importance Baking: A Lightweight Neural Solution to Importance Sampling Parametric BSDFs," 2022.

Bako, S., et al., "Deep Appearance Prefiltering," ACM Transactions on Graphics 42, 23 (2022), pp. 1-23, Issue 2.

Clarberg, P., et al., 2022, "Research Advances Toward Real-Time Path Tracing," Game Developers Conference.

Clarberg, P., et al., "Real-Time Path Tracing and Beyond," HPG 2022 Keynote.

Dinh, L., et al., "Density estimation using real NVP," In International Conference on Learning Representations, 2017.

Dupuy, J., et al., "Photorealistic Surface Rendering with Microfacet Theory," Ph.D. Dissertation, Universite Claude Bernard—Lyon I: Universite de Montreal, 2015.

Dupuy, J., et al., "Linear efficient antialiased displacement and reflectance mapping," ACM Transactions on Graphics (TOG) 32, 6 (2013).

Dupuy, J., et al., "An Adaptive Parameterization for Efficient Material Acquisition and Rendering," Transactions on Graphics 37, 6 (2018), 274:1-274:18.

Fan, J., et al., "Neural Layered BRDFs," In ACM SIGGRAPH 2022 Conference Proceedings (Vancouver, BC, Canada), Association for Computing Machinery, New York, NY, USA, Article 4, 8 pages.

Gauthier, A., et al., "MIPNet: Neural Normal-to-Anisotropic-Roughness MIP Mapping," ACM Trans. Graph, 41, 6, Article 246 (Nov. 2022), 12 pages.

He, Y., et al., "Slang: Language Mechanisms for Extensible Real-Time Shading Systems," ACM Transactions on Graphics 37, 4, Article 141 (2018), pp. 141:1-141:13.

Kallweit, S., et al., (2022) "The Falcor Rendering Framework," (version 5.2.).

Kuznetsov, A., et al., (2019) "Learning Generative Models for Rendering Specular Microgeometry," ACM Transactions on Graphics 38, 6, Article 225, 14 pages.

Kuznetsov, A., et al., "NeuMIP: Multi-Resolution Neural Materials," ACM Transactionis on Graphics 40, 4 (2021), 175:1-175:13.

Kuznetsov, A., et al., "Rendering Neural Materials on Curved Surfaces," 2022, In ACM SIGGRAPH 2022 Conference Proceedings (Vancouver, BC, Canda), Association for Computing Machinery, New York, NY, USA, Article 9, 9 pages.

Laine, S., et al., "Megakernels Considered Harmful: Wavefront Path Tracing on GPUs," In Proceedings of High-Performance Graphics, ACM, 137-143.

Matusik, W., et al., "A Data-Driven Reflectance Model," ACM Transactions on Graphics 22, 3 (2003), 759-769.

Mildenhall, B., et al., "NeRF: Representing Scenes as Neural Radiance Fields for View Synthesis," in ECCV, 2020.

Muller, T., et al., "Instant Neural Graphics Primitives with a Multiresolution Hash Encoding," ACM Trans. Graph. 41, 4, Article 102 (Jul. 2022), 15 pages.

Muller, T., et al., "Neural Importance Sampling," ACM Tarns. Graph. 38, 5 (2019), 145:1-145:19.

Muller, T., et al., "Neural Control Variates," ACM Trans. Graph. 39, 6, Article 243 (Nov. 2020), 19 pages.

Olano, M., et al., "Lean mapping," In Proceedings of the 2010 ACM SIGGRAPH symposium on Intera tive 3D Graphics and Games, Association for Computing Machinery, New York, NY, USA, 2010, pp. 181-188.

Rainer, G., et al., "United Neural Encoding of BTFs," Computer Graphics Forum (Proc. Eurographics) 39, 2, (2020), pp. 167-178.

Rebain, D., et al., "Attention Beats Concatenation for Conditioning Neural Fields," (2022).

Rusinkiewicz, S., et al., "A new change of variables for efficient BRDF representation," In Eurographics Workshop on Rendering Techniques, Springer, Springer Vienna, Vienna, pp. 11-22.

Smythe, D., et al., "MaterialX: An Open Standard for Network-Based CG Object Looks," Version 1.38, 2021.

Sztrajman, A., et al., "Neural BRDF Representation and Importance Sampling," Computer Graphics Forum 2021.

Thies, J., et al., "Deferred Neural Rendering: Image Synthesis Using Neural Textures," ACM Trans. Graph. 38, 4, Article 66 (Jul. 2019), 12 pages.

Trowbridge, T.S., et al., "Average Irregularity Representation of a Rough Surface for Ray Reflection," Journal of the Optical Society of America 65, 5 (1975), pp. 531-536.

Van Antwerpen, D., et al., "Improving SIMD Efficiency for Parallel Monte Carlo Light Transport on the GPU," In Proceedings of High Performance Graphics, ACM, pp. 41-50.

Vaswani, A., et al., "Attention is all you need," Advances in Neural Information Processing Systems 30 (2017).

Vogels, T., et al., "Denoising with Kernel Prediction and Asymmetric Loss Functions," ACM Transactions on Graphics (Proceedings of the SIGGRAPH 2018), 37, 4, Article 124 (2018), pp. 124:1-124:15.

Walter, B., et al., "Microfacet Models for Refraction Through Rough Surfaces," In Proceedings of the 18th Eurographics Conference on Rendering Techniques (EGSR 2007), Eurographics Association, pp. 196-206.

Zheng, C., et al., "A Compact Representation of Measured BRDFs Using Neural Processes," ACM Trans. Graph. 41, 2, Article 14 (Nov. 2021), 15 pages.

* cited by examiner

| Grease 111 |
| :---: |
| Dirt 112 |
| Metal 113 |

Neural Material Encoder-
Decoder System
200

240

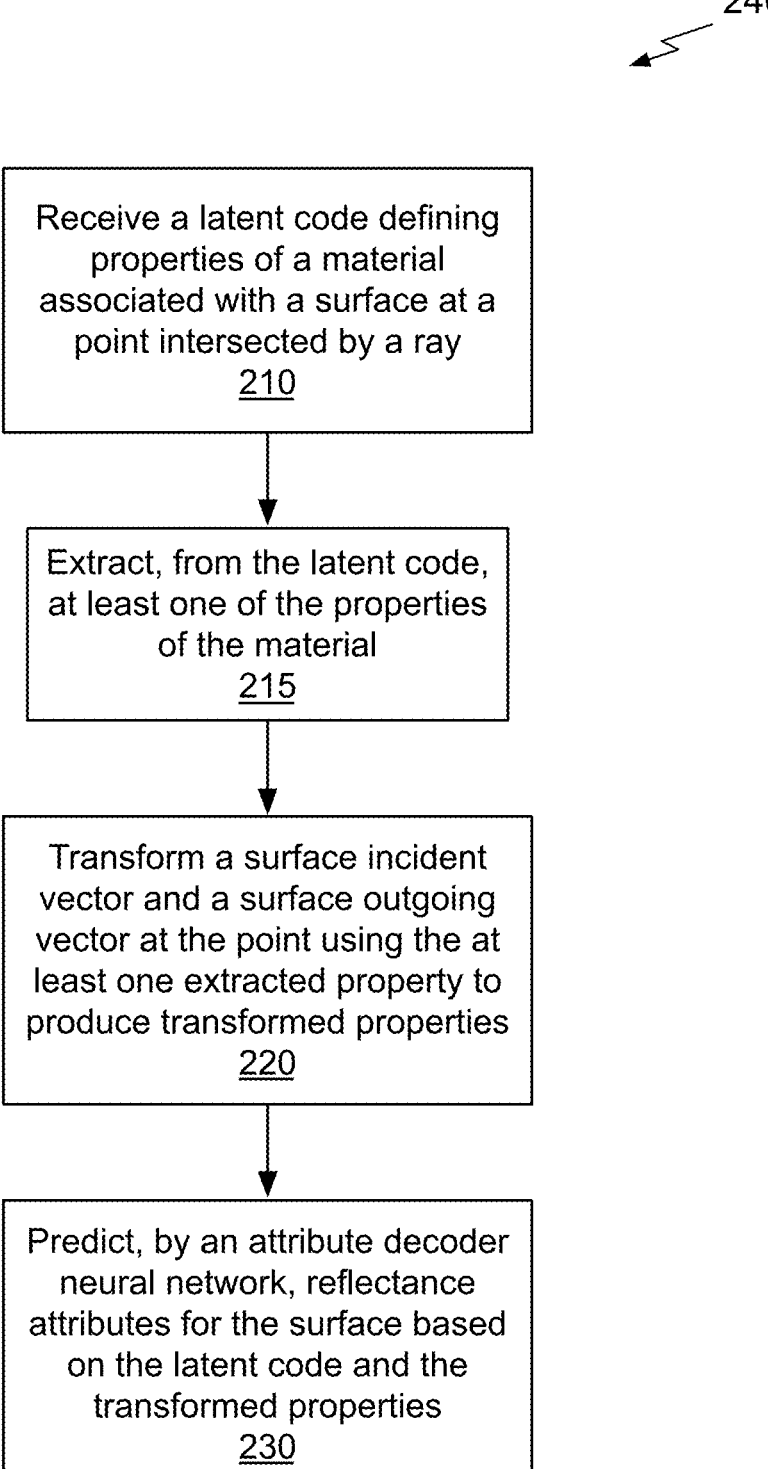

Receive a latent code defining properties of a material associated with a surface at a point intersected by a ray
210

Extract, from the latent code, at least one of the properties of the material
215

Transform a surface incident vector and a surface outgoing vector at the point using the at least one extracted property to produce transformed properties
220

Predict, by an attribute decoder neural network, reflectance attributes for the surface based on the latent code and the transformed properties
230

512 x 512 Texture                         4k x 4k Texture

340

512 x 512 Texture                         4k x 4k Texture

555

605

REAL-TIME NEURAL APPEARANCE MODELS

CLAIM OF PRIORITY

This application claims the benefit of U.S. Provisional Application No. 63/481,997 titled "Real-Time Neural Appearance Models," filed Jan. 27, 2023, the entire contents of which is incorporated herein by reference.

BACKGROUND

Rendering with complex realistic material appearance is computationally very intensive. Often large material graphs are used to describe the material appearance as a large number of connected nodes which represent different data and mathematical models. In offline renderers such material graphs are compiled into shader code that can be many thousands of lines of code. Real-time graphics renderers cannot afford to execute such expensive models and therefore use simplified material appearance models that are faster to evaluate but not as realistic.

Recent progress in rendering algorithms, light transport methods, and path (or ray) tracing hardware have pushed the limits of image quality that can be achieved in real time. However, progress in real-time material models has noticeably lagged behind. While deeply layered materials are commonplace in offline rendering, such approaches are often far too costly to be used in real-time applications. Aside from computational cost, sophisticated materials pose additional challenges for importance sampling and filtering: highly detailed materials will alias severely under minification, and the complex multi-lobe reflectance of layered materials causes high variance if not sampled properly. There is a need for addressing these issues and/or other issues associated with the prior art.

SUMMARY

Embodiments of the present disclosure relate to real-time neural appearance models. Using a neural decoder, scenes are rendered in real-time with complex material appearance previously reserved for offline use. Learned hierarchical textures representing the material properties are encoded as latent codes. When a ray is cast and intersects with geometry in the scene, the intersection point is mapped to one of the latent codes. The latent code is interpreted using small neural networks, neural decoders that accurately approximate realistic material appearance, including even large complex materials graphs. The neural decoders produce reflectance values and importance-sampled directions that can be used to determine a pixel color. A neural material (or appearance) model consists of learned parameters in the form of textures (latent code textures) and parameters (weights and biases) for the neural decoder. In one embodiment, neural material models are executed inside a renderer.

In an embodiment, a latent code defining properties of a material associated with a surface at a point intersected by a ray is received and at least one of the properties of the material is extracted from the latent code. A surface incident vector and a surface outgoing vector are transformed at the point using the at least one extracted property to produce transformed properties and an attribute decoder neural network predicts reflectance attributes for the surface based on the latent code and the transformed properties.

BRIEF DESCRIPTION OF THE DRAWINGS

The present systems and methods for real-time neural appearance models are described in detail below with reference to the attached drawing figures, wherein:

FIG. 2B illustrates a flowchart of a method for providing a neural appearance model suitable for use in implementing some embodiments of the present disclosure.

DETAILED DESCRIPTION

Embodiments of the present disclosure relate to real-time neural appearance models. Neural networks are employed to represent complex material appearance for rendering. In an embodiment, even small neural network models are able to very accurately approximate realistic material appearance, including even large complex materials graphs. A neural material (or appearance) model consists of learned parameters in the form of textures (latent code textures) and network parameters (weights and biases). In an embodiment, a texture is learned for each particular material. In one embodiment, the neural material models are executed with other shader code inside the renderer, enabling improved performance compared with executing the neural material models decoupled from the renderer. The same neural material model may represent a variety of materials by loading network parameters for each of the different neural materials, as needed, thereby reducing execution divergence compared with using a separate neural model for each material.

Figure 1A:
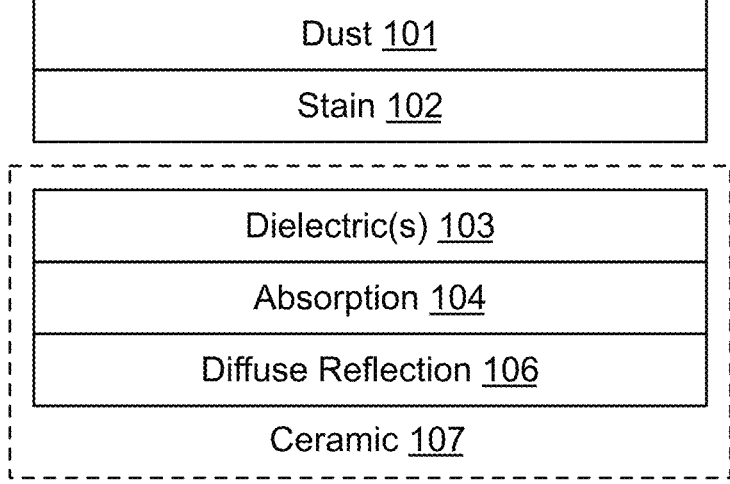
FIG. 1A illustrates an example rendered material, in accordance with an embodiment.
Figure 1A:

FIG. 1A illustrates example rendered materials 105, in accordance with an embodiment. A ceramic body of a teapot is associated with a first material comprising five layers. The layers include a ceramic sub-material 107 that includes dielectric(s) 103, absorption 104, and diffuse reflection 106. Additional layers include dust 101 and stain 102. In an embodiment, the dust 101 and stain 102 layers are interpreted as rough surfaces using an Oren-Nayar reflectance model that provides a reflectivity model for diffuse reflection. In an embodiment, the absorption 104 layer is interpreted using the Beer-Lambert law. In an embodiment, the diffuse reflection 106 layer is interpreted using Lambertian reflectance to provide the diffuse reflection.

The neural material model (encoder-decoder) learns intricate details and complex multi-layered material behavior of the ceramic, fingerprints, smudges, and dust which are responsible for the realism of the object. In an embodiment, a material encoder comprises a neural network that is trained to learn a particular material, after which the neural network is replaced with a neural texture. The neural material model is typically faster to evaluate than conventional non-neural models of similar complexity. For each ray that intersects the ceramic body of the teapot, a latent texture code corresponding to the first material is determined by the material encoder and provided to a neural material decoder. The surface parameters (material properties or attributes) corresponding to each ray intersection may include albedo, normal vector, tangent vector, roughness, depth of scratches, thickness of cracks, concentration of melanin in skin, and other bidirectional reflectance distribution function (BRDF) parameters. The neural material decoder processes the latent code to predict the BRDF parameters needed to render the teapot. In an embodiment, the neural material decoder also performs importance sampling to predict a next direction for a path that includes the ray.

Figure 1B:
FIG. 1B illustrates another example rendered material, in accordance with an embodiment.
Figure 1B:
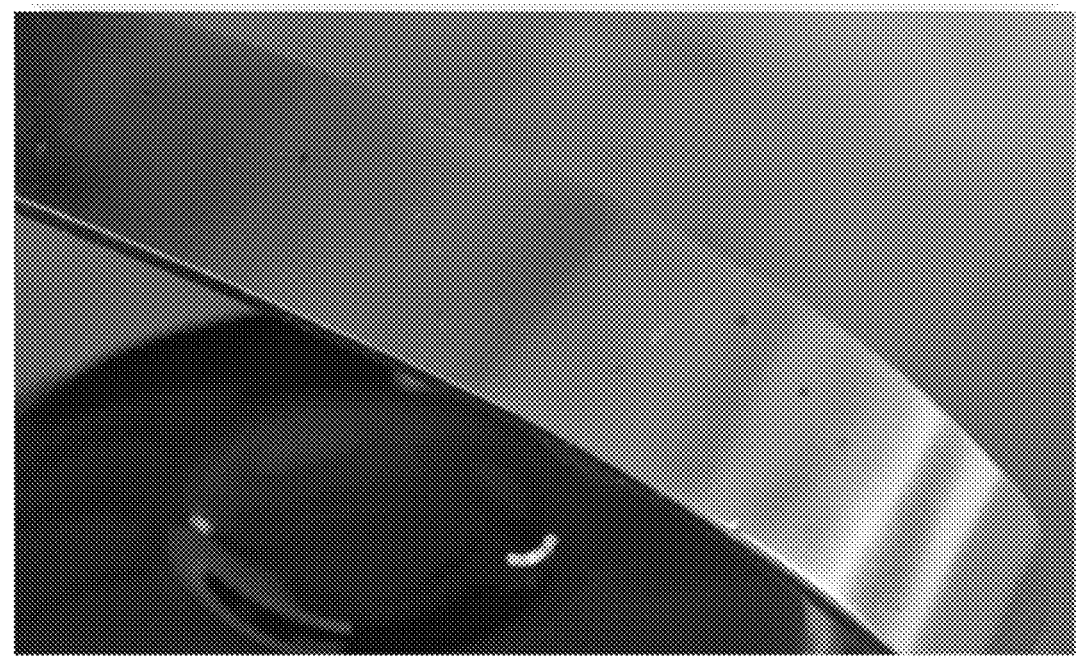

FIG. 1B illustrates example rendered materials 115, in accordance with an embodiment. A metal handle of the teapot is associated with a second material comprising three layers. The layers include grease 111, dirt 112, and metal 113. In an embodiment, the dirt 112 is interpreted as a rough surface using the Oren-Nayar reflectance model. In an embodiment, the grease 111 and metal 113 are interpreted as conductors. For each ray that intersects the metal handle of the teapot, a latent texture code corresponding to the second material is determined by the material encoder and provided to the neural material decoder. The neural material decoder processes the latent code to predict the BRDF parameters needed to render the teapot.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1C:
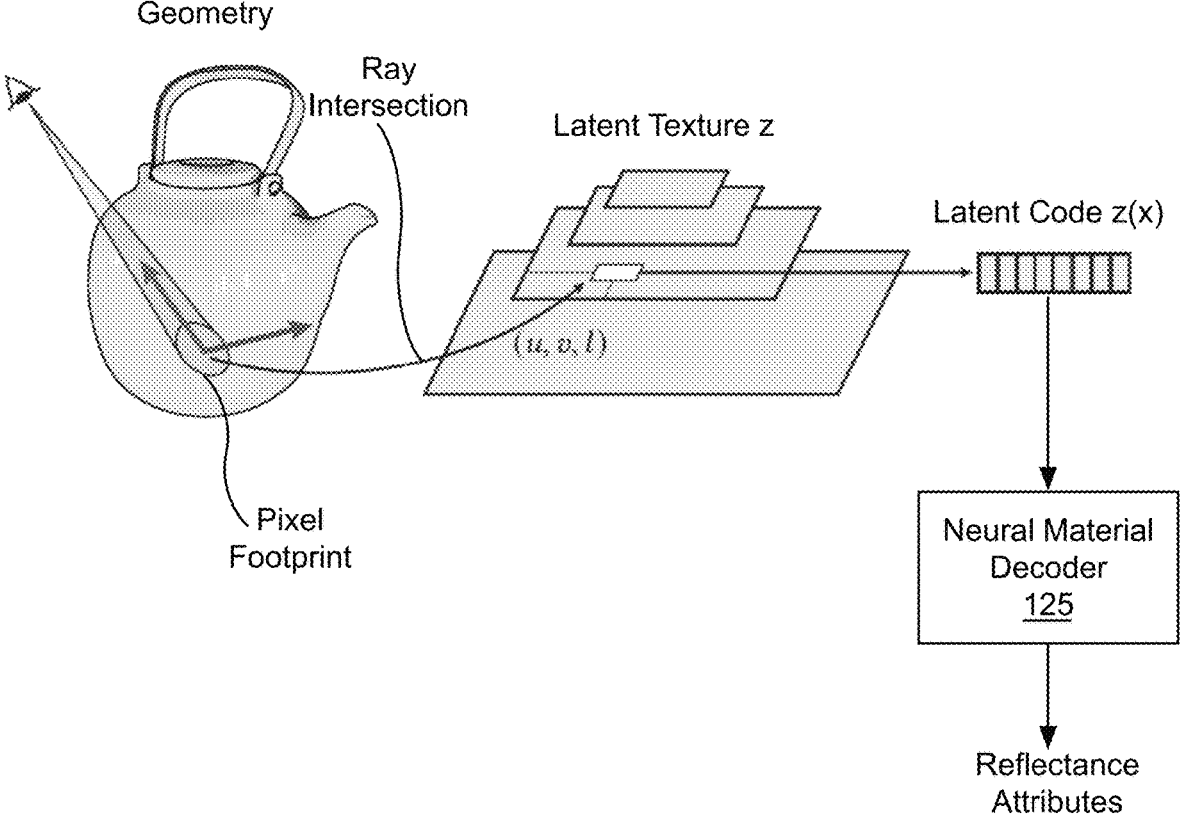
FIG. 1C illustrates a conceptual diagram of a neural appearance model suitable for use in implementing some embodiments of the present disclosure.

FIG. 1C illustrates a conceptual diagram of a neural appearance model suitable for use in implementing some embodiments of the present disclosure. The neural appearance model includes two main components: a latent texture and a neural material decoder 125. In an embodiment, during training, a latent code z(x) is computed from surface parameters by a neural material encoder. In an embodiment, the latent codes are stored as a latent texture and retrieved using ray intersections during real-time application. In an embodiment, the neural appearance model is implemented as a neural material encoder-decoder system, as described in conjunction with FIGS. 1D and 2A. The latent texture and the neural material decoder 125 are jointly optimized to represent a specific material or a set of materials, such as the first material or the second material, described in conjunction tion with FIGS. 1A and 1B. Layered materials are supported by optimizing the combined effect of multiple layers, instead of relying on explicit layering of the original material and layering of neural components. Based on the latent code, the neural material decoder 125 predicts reflectance attributes (e.g., BRDF values and albedo) for a layered material.

The neural appearance model simulates the appearance of real materials resulting from the interaction of light with matter. In an embodiment, the latent codes are stored in a UV-mapped, hierarchical texture, where each texel characterizes the appearance of the object at a given spatial location and scale. To maintain fidelity of the original material, a resolution of the finest level of the hierarchical texture is set to the texture resolution of the original material, and UV-parametrization is leveraged to preserve the original texel density. In an embodiment, during rendering, rays are traced or cast towards the surface of the teapot geometry. A pixel footprint at a ray intersection point of the ray on the surface is determined, and the footprint is projected into UV space, producing location (u, v). An appropriate level of the texture pyramid, l is computed based on the area of the pixel footprint.

The level l may be fractional and lie between two levels of the pyramid. In an embodiment, one of the two levels is probabilistically selected (e.g., using Russian roulette), and the latent code is computed via bilinear interpolation within the level. Probabilistic selection introduces a small, but bounded amount of variance. In an embodiment, the probabilistic selection yields higher quality than the more commonly used method of trilinearly interpolating the latent codes. This is likely because the trilinear interpolation induces an additional constraint that the latent interpolation and subsequent prediction of reflectance attributes produce plausible BRDF values across levels, even though the levels may store very different content.

Highly detailed materials may cause severe aliasing under minification. By default, the neural material decoder 125 would reproduce such aliasing. To avoid introduction of aliasing, each level of the pyramid contains latent codes that characterize the original material filtered with a specific filter radius. The neural material decoder 125 is trained to infer the properly filtered BRDF value for all levels of the pyramid. Alternatively, aliasing may be avoided using supersampling which averages high frequency glints and produces a filtered material, but at impractical sample cost for real-time performance. In an embodiment, the neural appearance model can render filtered materials without aliasing at any distance, and without performing supersampling.

Material appearance can be described using the spatially varying bidirectional reflectance distribution function (SVBRDF), $f(x, \omega_i, \omega_o)$ that quantifies the amount of scattered differential radiance $dL_o(x, \omega_o)$ due to incident radiance $L_i(x, \omega_i)$:

$$f(x, \omega_i, \omega_o) = \frac{dL_o(x, \omega_o)}{L_i(x, \omega_i)\cos\theta_i d\omega_i} \qquad \text{Eq. (1)}$$

where x is a surface point, $\omega_i$, $\omega_o$ are incident and outgoing directions, respectively, and $\theta_i$ is the angle between $\omega_i$ and the surface normal. The SVBRDF can be integrated over the upper hemisphere $H^2$ to produce directional albedo $\alpha(x, \omega_o)$:

$$\alpha(x, \omega_o) = \int_{H^2} f(x, \omega_i, \omega_o)\cos\theta_i d\omega_i. \qquad \text{Eq. (2)}$$

In an embodiment, SVBRDF and directional albedo are predicted by the neural material decoder 125 as the reflectance attributes. The neural appearance model serves as an optimized representation of existing (reference) SVBRDFs. That is, given a target material $f$ (x, $\omega_i$, $\psi_o$), a function g≈$f$ closely approximates the reference material and can be evaluated in real time.

The latent texture represents spatial variations of the material with a compact, eight-dimensional code denoted z. Given a query location x and the corresponding latent code z(x), the BRDF value is inferred by the neural material decoder 125, g with trainable parameters θ:

$$f(x, \omega_i, \omega_o) \approx g(z(x), T \cdot \omega_i, T \cdot \omega_o; \theta), \qquad \text{Eq. (3)}$$

where T represents a transformation of incident and outgoing directions to a number of learned shading frames.

Figure 1D:
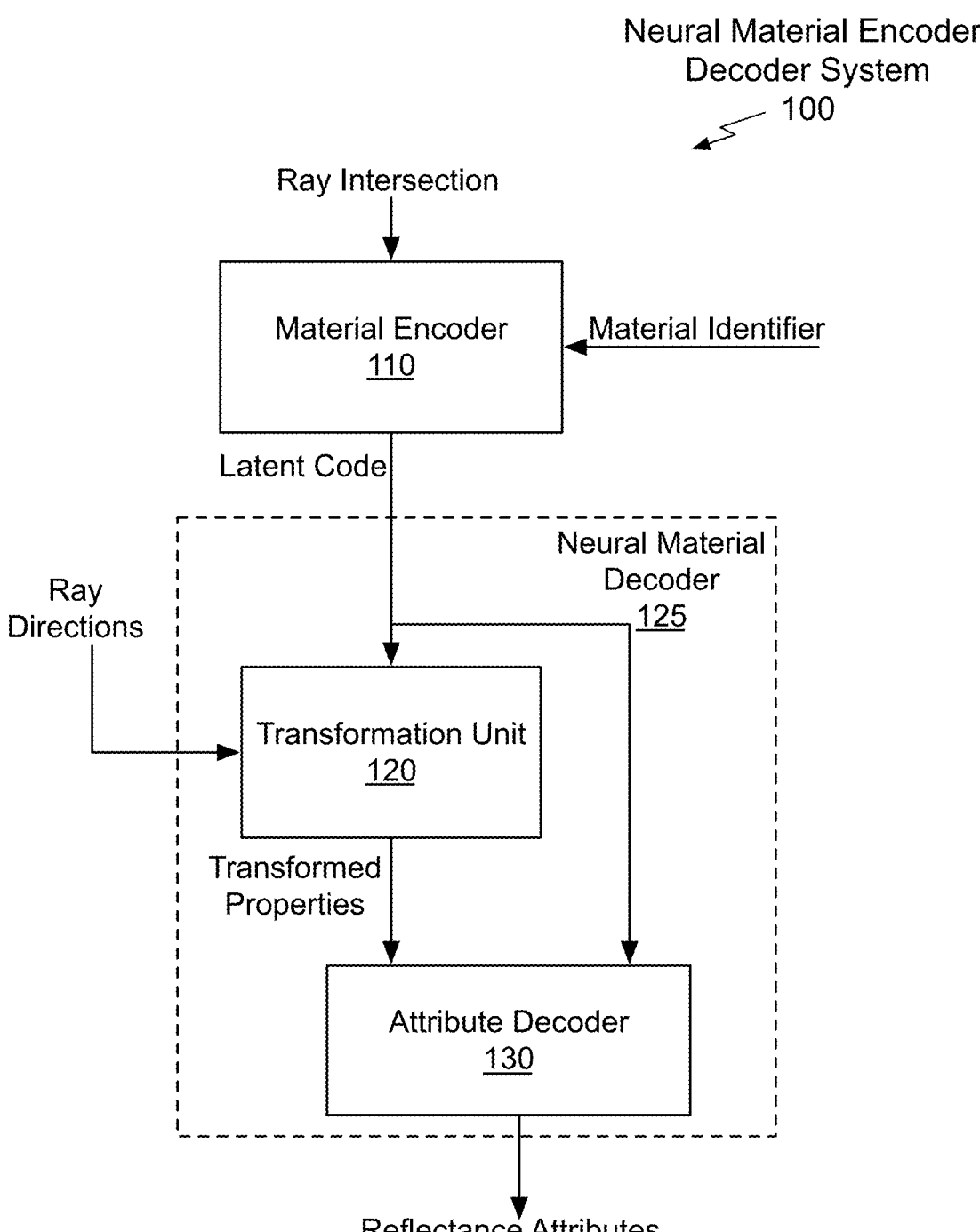
FIG. 1D illustrates a block diagram of an example neural material encoder-decoder system suitable for use in implementing some embodiments of the present disclosure.

FIG. 1D illustrates a block diagram of an example neural material encoder-decoder system 100 suitable for use in implementing some embodiments of the present disclosure. In an embodiment, the neural material encoder-decoder system 100 implements the neural appearance model illustrated in FIG. 1C. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the neural material encoder-decoder system 100 is within the scope and spirit of embodiments of the present disclosure.

The neural material encoder-decoder system 100 includes a material encoder 110 and a neural material decoder 125 that includes a transformation unit 120 and an attribute decoder 130. The material encoder 110 receives a ray intersection and a material identifier associated with the surface that is intersected by the ray. The material encoder 110 is trained to encode the material surface parameters $k_x$ at ray intersections into latent texture codes. The ray intersection is defined by a pixel footprint at the intersection point that is projected into (u,v) texture space. The surface parameters (material properties or surface attributes) corresponding to each ray intersection may include albedo, normal vector, tangent vector, roughness, depth of scratches, thickness of cracks, concentration of melanin in skin, and other BRDF parameters. The layered material produces intricate SVBRDFs, where reflection lobes shift in direction across the surface. A material may feature as many normal maps as scattering layers. The stack of layers may be combined, while still allowing for multiple normal maps.

In an embodiment, the material encoder 110 is replaced with a learned hierarchical texture corresponding to the material identifier and coordinates of the ray intersection are used to sample the hierarchical texture to produce the latent code. In an embodiment, the latent codes stored in the learned hierarchical texture are learned by the material encoder 110 during training. In other words, the reference material is effectively "baked" into a neural texture by the material encoder 110. By mapping BRDF parameters to a latent space, the material encoder 110 converts a set of traditional textures (per-layer albedo, normal map, etc.) into a single multi-channel latent texture. Using the material encoder 110, instead of optimizing the texture directly, is key to support materials with high-resolution textures. In an embodiment, the material encoder 110 initially comprises a neural network that is trained for an initial duration and, partway through training, the hierarchical latent texture is created and replaces the neural network. The hierarchical latent texture is then finetuned through direct optimization for the remaining duration of the training. This approach combines the speed of the neural material encoder-decoder system 100 with the flexibility of direct optimization. In contrast, conventional techniques initialize a latent texture with random values and update the values via back-propagation which is very costly for large textures with millions of texels.

The latent code is processed by the transformation unit 120 which extracts learned shading frames from the latent code. The shading frame defines the local orientation of the material, which may differ from the orientation of the surface to which the material is applied. The shading frames may include multiple normal and tangent vectors. N normal and tangent vectors are combined with N bitangents (b) to produce a combined transformation matrix T. In the context of the following description, a shading frame describes a 3-dimensional coordinate system where the X, Y, and Z axes respectively correspond to the tangent, bitangent, and normal. Incident and outgoing directions of the ray at the intersection point ($\omega_i$, $\omega_o$) are input to the transformation unit 120 (ray directions) and are transformed by a transformation matrix (T), producing N transformed directions that are output as transformed properties. T encodes the transformation for representing a direction in the shading frame(s).

In an embodiment, the transformation unit 120 comprises a single trainable layer that extracts a fixed number N of normals ($n_1$, . . . $n_N$) and tangent vectors ($t_1$, . . . $t_N$) for each i-th pair of normalized normals and tangents, and constructs a combined transformation matrix T:

$$T = \begin{bmatrix} t_{1,x} & t_{1,y} & t_{1,z} & \ldots & t_{N,x} & t_{N,y} & t_{N,z} \\ b_{1,x} & b_{1,y} & b_{1,z} & \ldots & b_{N,x} & b_{N,y} & b_{N,z} \\ n_{1,x} & n_{1,y} & n_{1,z} & \ldots & n_{N,x} & n_{N,y} & n_{N,z} \end{bmatrix}^T. \qquad \text{Eq. (4)}$$

The transformation unit 120 computes the product T·$\omega_i$ and T·$\omega_o$, resulting in N new incident and outgoing vectors as the transformed properties, providing one pair of vectors for each of the learned shading frames. The transformation matrix T enables rotation of the input directions in to multiple, spatially varying shading frames in a single operation, improving the representational power of the material encoder-decoder system 100.

In an embodiment, T is a rotation from the canonical shading frame (which uses directions tangent=[1,0,0], bitangent=[0,1,0], and normal=[0,0,1]) to the learned shading frame. When using a single learned shading frame, T is simply the corresponding rotation matrix. For multiple learned shading frames, the transformation matrix T is obtained by stacking the rotation matrices corresponding to each learned shading frame. T enables efficient modeling of complex materials in real time. In an embodiment, the transformation unit 120 extracts other properties of the material from the latent code, such as a different description of the geometry, albedo, roughness, or even a different set of surface parameters that are altered to change the appearance of the material and provided to the attribute decoder 130 as transformed properties.

The attribute decoder 130 receives the latent code and transformed properties and performs material evaluation to predict reflectance attributes (BRDF) needed for rendering. In one embodiment the reflectance attributes comprise the ratio of reflected radiance along the incident and outgoing ray directions, expressed as a scalar value (grayscale), 3-channel value (RGB), or multi-channel value (spectral). In an embodiment, the attribute decoder 130 also predicts directional albedo $\alpha$, surface roughness (r), or other attributes describing the properties of the surface that may be useful for image denoising. In one embodiment, such additional reflectance attributes are given as input to an image denoiser unit (not shown).

In contrast with the neural material decoder 125, a conventional multi-layer perceptron (MLP) struggles with rotating directions. This is because, even though MLPs are built from matrix operations, a MLP can only perform multiplicative transformations of the inputs with the (fixed) network weights. The MLP cannot readily multiply the input dimensions with each other. A conventional decoder with a vanilla MLP cannot easily multiply $\omega_i$, $\omega_o$, with the latent code, which stores spatial variations of the material. The conventional decoder is forced to approximate the multiplicative transform using its trainable layers, depleting its modeling capacity. Instead, in an embodiment, the multiplicative transform is performed between two processing layers within the neural material decoder 125.

Using neural materials in a Monte Carlo renderer relies on an importance sampling technique. Furthermore, for real-time performance, acceptable variance levels need to be achieved at extremely low sample rates. A subset of samplers suitable for representation by a neural network may be considered for sampling ray directions, including: an invertible transform W from random variates $u \in [0,1)^2$ into outgoing directions $\omega_o = W(u;x,\omega_i)$, and its associated probability density function (PDF) $p(\omega_o;x,\omega_i)$. Low variance results are achieved whenever the shape of p closely matches $f$. However, optimizing an MLP to perform the sample transform W does not guarantee invertibility of W and tractable PDF evaluations. Importance sampling thus requires a different approach than BRDF evaluation. In an embodiment, a neural network drives an existing analytic proxy distribution that is invertible in closed form. In an embodiment, a linear blend between a cosine-weighted hemispherical density and a specular reflection component is used. Instead of using isotropic models (e.g., Blinn-Phong model or a 2D Gaussian in projected half vector space), in an embodiment, a more general state-of-the-art microfacet model including elliptical anisotropy and non-centered mean surface slopes is used. Such a microfacet model is well-suited both to the strongly normal-mapped materials represented in the target materials, as well as filtered BRDFs that naturally produce anisotropic distributions. While the neural material encoder-decoder system 100 utilizes learned hierarchical latent textures to produces reflectance values, in an embodiment, an additional neural decoder produces importance-sampled directions (e.g., an outgoing ray).

Figure 2A:
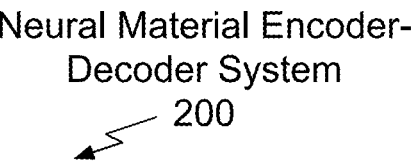
FIG. 2A illustrates a block diagram of an example neural material encoder-decoder system with importance sampling, in accordance with an embodiment.
Figure 2A:
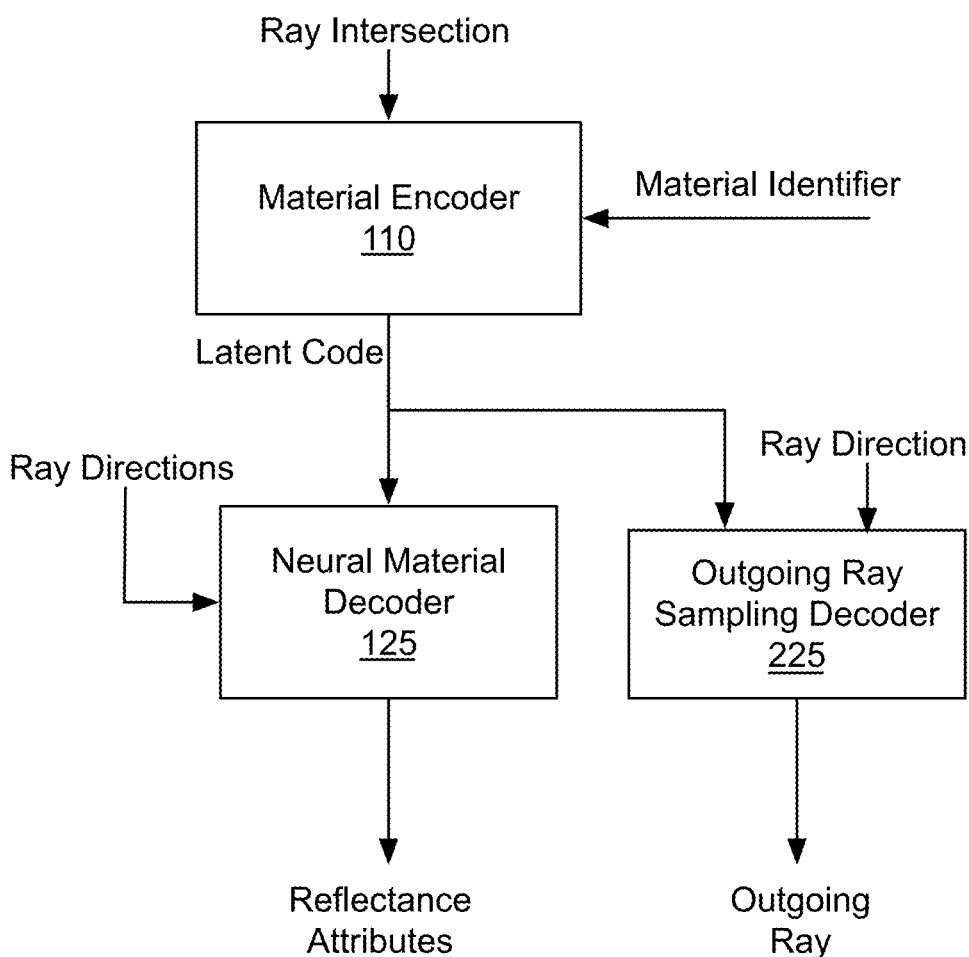

FIG. 2A illustrates a block diagram of a neural material encoder-decoder system 200 with importance sampling, in accordance with an embodiment. The neural material encoder-decoder system 200 includes the material encoder

110 and the neural material decoder 125 in addition to an outgoing ray sampling decoder 225. The outgoing ray sampling decoder 225 performs importance sampling using the latent code and the incident ray (ray direction) to compute an outgoing ray direction (outgoing ray) of a next segment of a path that includes the input ray. The outgoing ray sampling decoder 225 infers parameters of the analytic model from the same latent code as used for the BRDF evaluation. In an embodiment, normal and tangent vectors at the intersection point (not extracted from the latent code) are also used to compute the outgoing ray to improve the quality of sampled directions. In an embodiment, the ray direction, $\omega_i$ is provided as an input to the outgoing ray sampling decoder 225 to capture Fresnel-like effects where, e.g., the diffuse-specular mixing weights vary as a function of the incident angle.

In an embodiment, to best utilize the modeling capacity of the neural material decoder 125 and the outgoing ray sampling decoder 225, two graphics priors may be used. The first prior-transformation of directions into learned shading frames-facilitates accurate reconstruction of mesoscale effects. The second prior—a microfacet sampling distribution—allows the outgoing ray sampling decoder 225 to perform importance sampling efficiently. The resulting neural material encoder-decoder system 200 supports anisotropic sampling and level-of-detail rendering and learns deeply layered material graphs that can be converted into a compact unified neural representation as a latent texture.

To be useful, a neural appearance model, such as the neural material encoder-decoder system 100 or 200 should satisfy a number of properties including, without limitation, visual fidelity, level of detail, importance sampling, performance, and practicality. Visual fidelity is needed to faithfully reproduce a broad range of challenging materials, including multi-layer materials with low-roughness dielectric coatings, conductors with glints, stains, and anisotropy. Rather than simply reproducing spatially uniform measured material datasets, materials with high resolution textures (4 k resolution and above) with detailed normal maps should also be supported.

Regarding level-of-detail, as previously explained, unfiltered high-resolution materials tend to alias under minification and properly filtered reflectance can change significantly within a pixel footprint. The material encoder 110 supports filtered lookups of the material and thus enables all-scale rendering at low sample counts. The importance sampling performed by the outgoing ray sampling decoder 225 permits deployment in Monte Carlo estimators, such as path tracing. The neural material encoder-decoder system 200 therefore solves the traditionally challenging problem of importance sampling filtered versions of the material. The neural material encoder-decoder system 100 or 200 can achieve real time performance, with material evaluation only using a small fraction of the total frame time. Furthermore, the neural material encoder-decoder system 100 or 200 is compatible with path tracing, where materials are evaluated at random locations over many bounces. In contrast, large neural networks and models that rely on convolution operations are unable to execute in real time during path tracing. Finally, because optimization of the neural material can occur in an offline process, training times remain reasonable even for high material resolutions (4 k and beyond). Days of training time are not practical.

FIG. 2B illustrates a flowchart of a method 240 for providing a neural appearance model suitable for use in implementing some embodiments of the present disclosure. Each block of method 240, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 240 is described, by way of example, with respect to the neural material encoder-decoder system 100 and 200 of FIGS. 1D and 2A, respectively. However, this method may additionally or alternatively be executed by any one system, or any combination of systems, including, but not limited to, those described herein. Furthermore, persons of ordinary skill in the art will understand that any system that performs method 240 is within the scope and spirit of embodiments of the present disclosure.

At step 210, a latent code defining properties of a material associated with a surface at a point intersected by a ray is received. In an embodiment, the latent code is obtained from a stored texture using coordinates of the point. In an embodiment, the material comprises at least one layer including one or more of a low-roughness dielectric coating, conductor with glints, or stains. In an embodiment, the material comprises at least one volumetric layer. In an embodiment, the properties of the material comprise albedo, roughness, a normal vector, and a tangent vector. At step 215, at least one of the properties of the material is extracted from the latent code. In an embodiment, at least one of the properties is extracted by an extraction neural network that comprises the transformation unit 120.

At step 220, a surface incident vector and a surface outgoing vector at the point are transformed using the at least one extracted property to produce transformed properties. In an embodiment, the at least one extracted property is altered to produce the transformed properties. In an embodiment, the transformation unit 120 produces the transformed properties. In an embodiment, the surface incident vector, normal and tangent vectors at the point intersected by the ray, and the latent code are processed by a neural sampling decoder to predict a next segment of a path that includes the ray. In an embodiment, the neural sampling decoder comprises the outgoing ray sampling decoder 225.

At step 230, reflectance attributes for the surface are predicted, by an attribute decoder neural network, based on the latent code and the transformed properties. In an embodiment, the attribute decoder neural network comprises the attribute decoder 130. In an embodiment, at least one of directional albedo, directionless albedo, roughness estimation, or transmissivity for the surface is predicted based on the latent code and the transformed properties.

In an embodiment, a material encoder, such as the material encoder 110 processes at least one of coordinates and surface parameters of the point intersected by the ray according to learned parameters to generate the latent code. In an embodiment, the material encoder processes not only the coordinates, but also surface parameters corresponding to the material. In an embodiment, the material encoder is only used during training. In an embodiment, the material encoder is trained by: determining sample points on the surface; at each sample point of the sample points, processing the properties of the material according to learned parameters to generate estimated latent codes; and processing the estimated latent codes to predict estimated reflectance attributes at the sample points. In an embodiment, the learned parameters are adjusted based on differences between the estimated reflectance attributes and reference reflectance attributes. In an embodiment, decoding parameters, applied to the estimated latent codes by the neural material decoder to predict the estimated reflectance attributes, are adjusted based on differences between the estimated reflectance attributes and reference reflectance attributes.

A significant challenge in learning highly detailed materials is the sheer number of neural network parameters and latent codes that need to be optimized. Although the number of neural network weights is small, the resolution of the latent texture matches the texture resolution of the source material and can be considerable: the ceramic body of the teapot shown in FIG. 1A is defined using fourteen 4 k×4 k textures totaling 235 million texels, or 2.5 billion latent parameters. Optimizing so many parameters independently using backpropagation is impractical. Therefore, the material encoder 110 may initially comprise a neural network (or MLP) that is replaced with the hierarchical latent texture during the training process.

Figure 3A:
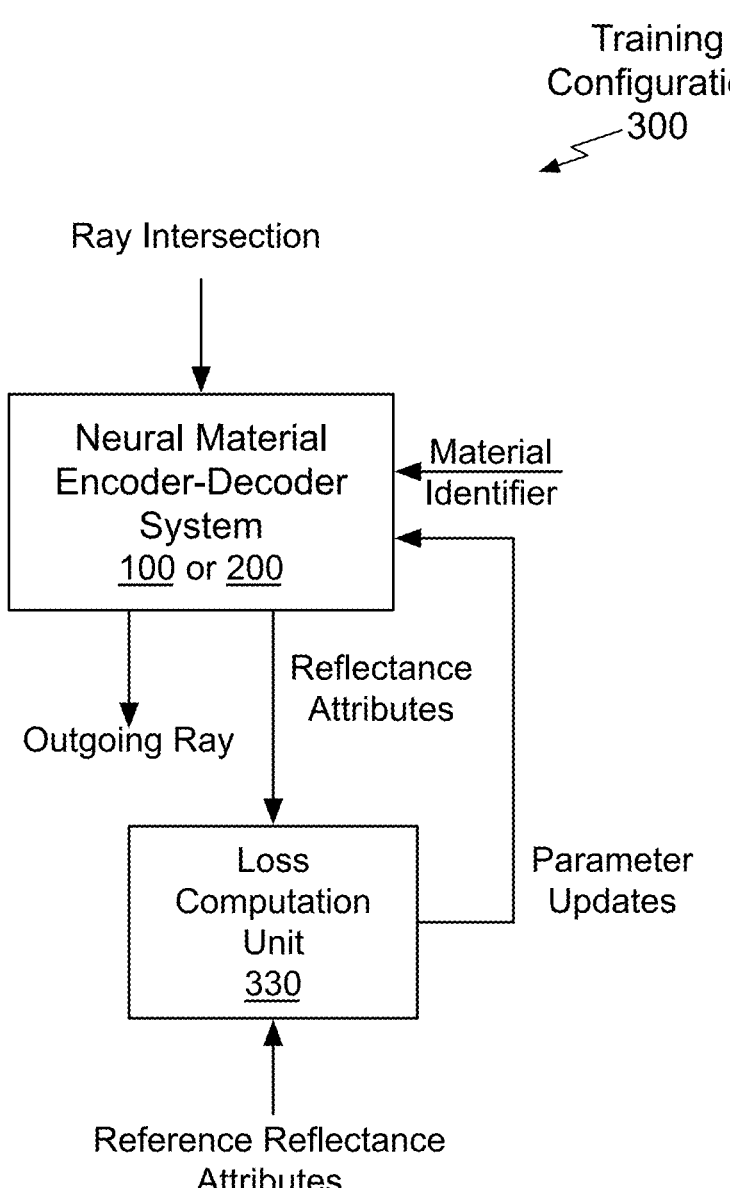
FIG. 3A illustrates a block diagram of a training configuration, in accordance with an embodiment.

FIG. 3A illustrates a block diagram of a training configuration 300, in accordance with an embodiment. The neural material encoder-decoder system 200 with importance sampling is trained end-to-end by sampling the material properties at multiple ray intersection sample points on the surface and predicting estimated reflectance attributes and an estimated outgoing ray at the sample points. In an embodiment, the neural material encoder-decoder system 200 is replaced with the neural material encoder-decoder system 100 for training. Parameters of the material encoder 110, transformation unit 120, attribute decoder 130, and the outgoing ray sampling decoder 225 are adjusted based on a loss function implemented by a loss computation unit 330. The loss function reduces differences between the estimated reflectance attributes (and directional albedo) at the sample points and the same type of reflectance attributes of a reference BRDF model (reference reflectance attributes). In an embodiment, the reference BRDF model is based on the properties of the materials associated with the surface. In an embodiment, the reference BRDF model is a measured material and the measured values correspond to the reference reflectance attributes. In an embodiment, the properties of the materials associated with the surface (and material identifiers) that are provided to the material encoder 110 are the measured values, so that the latent code is computed from the reference BRDF model. Using the measured values may improve accuracy of the neural material encoder-decoder system 200.

In an embodiment, the initial material encoder 110 is a simple MLP that takes the parameters k(x) of the original material (albedo, roughness, normal maps, etc. for all material layers) at a given query location x as input, and outputs the corresponding latent vector z(x). To bootstrap the filtering, the material parameters k(x) may be prefilter for coarse MIP levels of the hierarchy. In the first training phase, the neural material encoder-decoder system 100 or 200 is trained end-to-end by forwarding the latent code from the material encoder 110 directly to the neural material decoder 125. After the neural material decoder 125 converges, training transitions from the first phase to a finetuning phase. At the transition between training phases, the latent texture is initialized by evaluating the material encoder 110 for all of the texels and the neural network (or MLP) comprising the initial material encoder 110 is replaced with the hierarchical latent texture.

Training continues as the latent texture is finetuned by sampling the UV space and MIP levels of the texture and directly optimizing the texels. In an embodiment, contents of the latent texture are then trained directly using backpropagation through the neural material decoder 125. In an embodiment exponentially distributed filter footprints are sampled to optimize all levels of the latent texture and the neural material decoder 125 and the outgoing ray sampling decoder 225 are trained with prefiltered versions of the input material. Because the initial neural network used in the material encoder 110 is only used during training, it has no impact on the evaluation cost during rendering.

Beyond speeding up training, the material encoder 110 also improves the structure of the latent space: it guarantees that similar material parameters are mapped to similar points in the latent space. The improved structure leads to better results under interpolation and makes the job of the neural material decoder 125 easier. In contrast, conventional direct optimization of the latent texture is prone to leaving a portion of the random initialization noise in the latent texture. The material encoder 110 can be optimized to encode multiple materials, or even the full appearance space spanned by the reference BRDF (by sampling the attributes uniformly). Because the latent textures have a large memory footprint, in practice each one may be trained individually along with a dedicated material encoder 110.

Figure 3B:
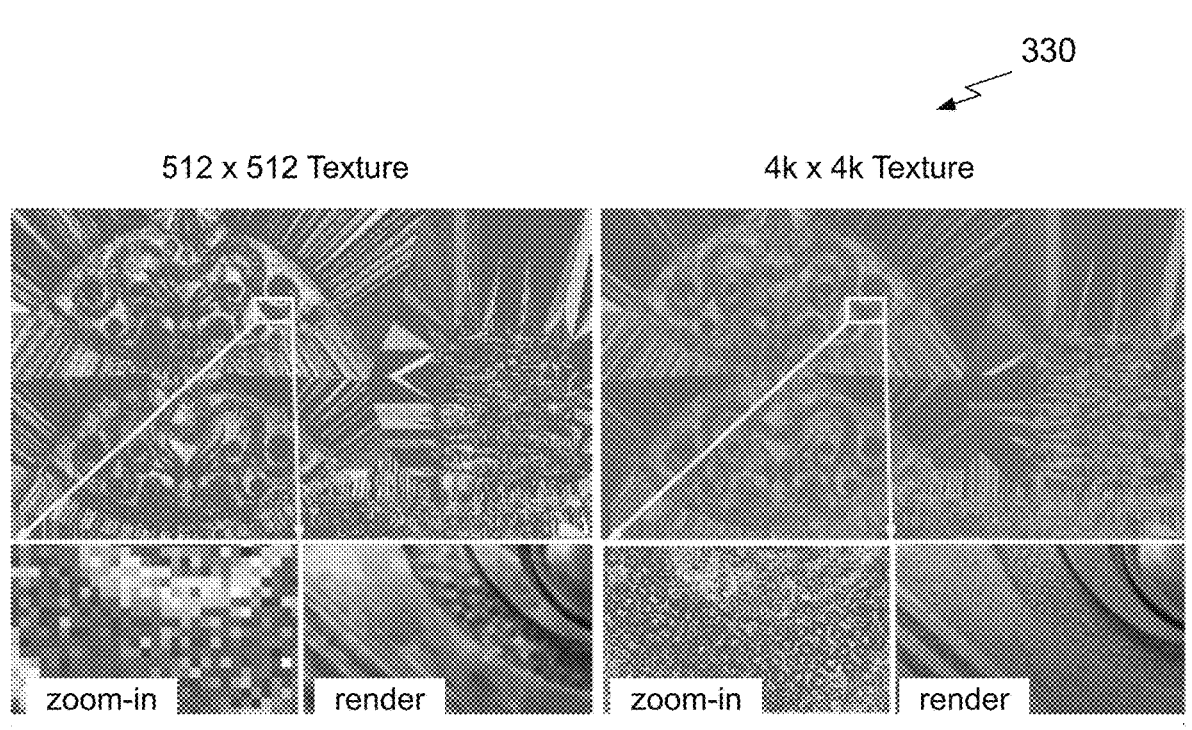
FIG. 3B illustrates optimized latent textures, in accordance with an embodiment.
Figure 3B:
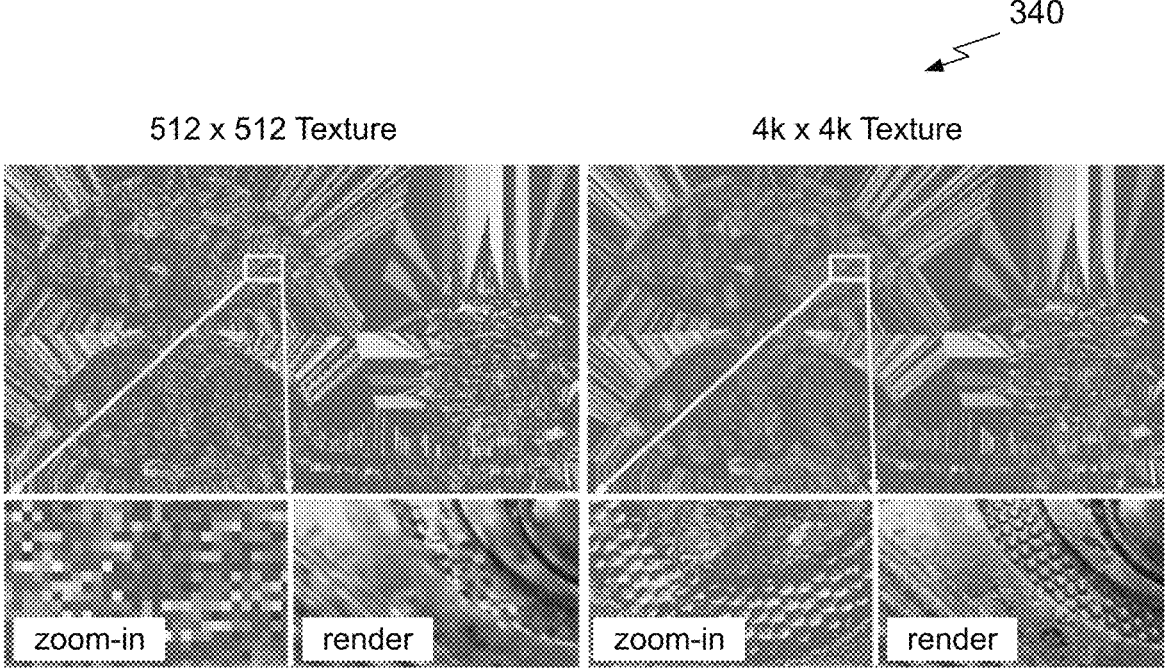

FIG. 3B illustrates optimized latent textures 330 and 340, in accordance with an embodiment. The latent textures 330 are randomly initialized and optimized directly without an encoder and the latent textures 340 are optimized using the material encoder 110. Insets (zoom-in and render) show a close-up of the learned texture and the rendered appearance of the inset region. Direct optimization works well only for small textures, such as the 512×512 textures. Direct optimization struggles with high resolutions, such as the 4 k×4 k textures, as independently optimizing individual texels is computationally inefficient. At resolution 4 k×4 k, the directly optimized texels receive roughly 64× fewer gradient updates compared with directly optimized texels of the 512×512 latent texture. Therefore, the neural material decoder 125 has to map vastly different latent codes (due to random initialization) to the same BRDF value, hindering performance. Much of the initialization noise is still visible in the converged latent texture 330, even after many training iterations.

The latent textures 340 are learned using the material encoder 110 during the first training phase, after which the latent texture 340 is determined. In contrast with using only direct optimization, the material encoder 110 provides a more data- and compute-efficient approach, yielding high-fidelity visuals. Even using the same amount of training data, the direct optimization consumed nearly double the training time compared with using the material encoder 110 due to having a significantly higher memory requirement.

Figure 3C:
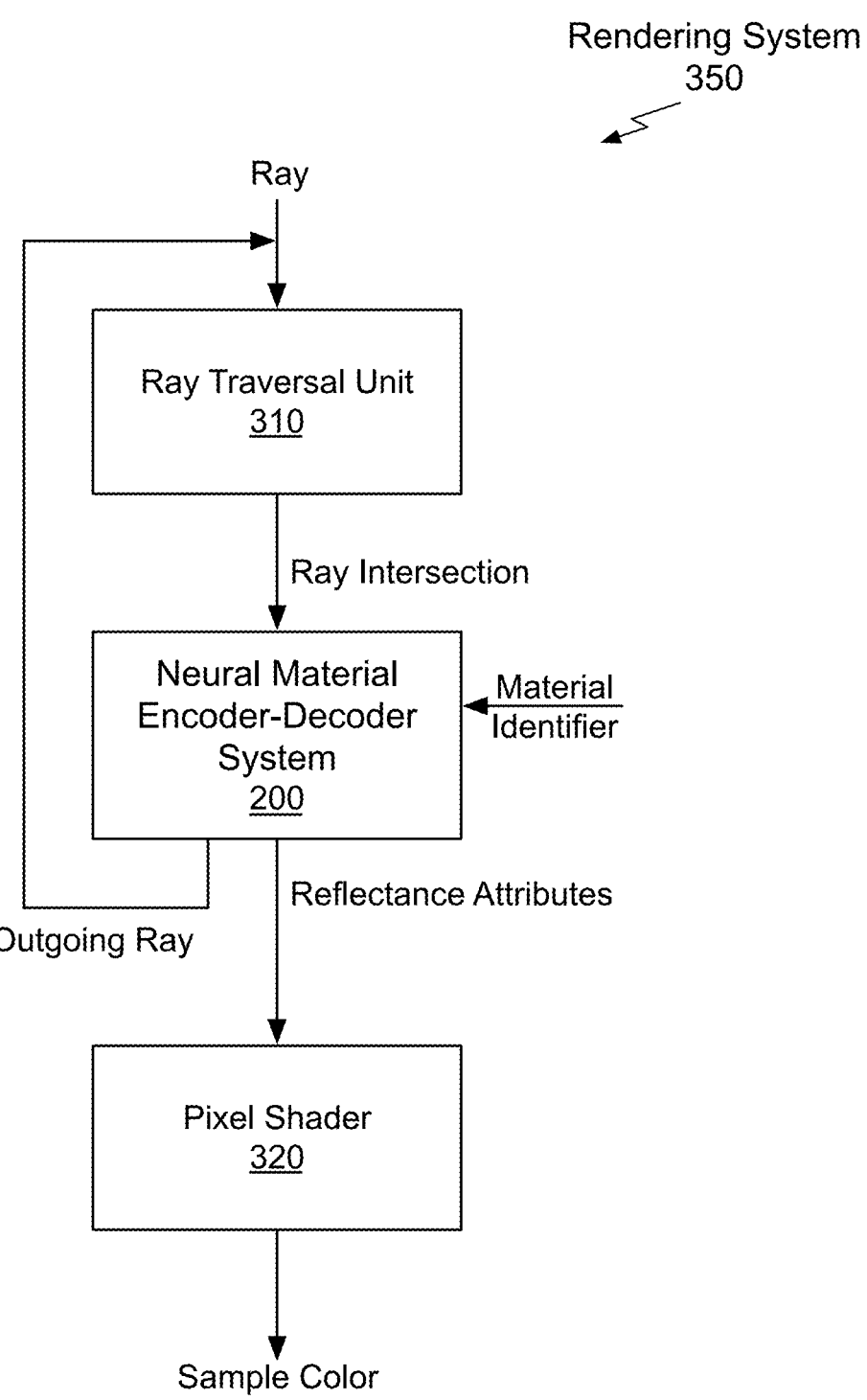
FIG. 3C illustrates a block diagram of a pixel rendering unit, in accordance with an embodiment.

FIG. 3C illustrates a block diagram of a pixel rendering system 350, in accordance with an embodiment. The neural material encoder-decoder system 200 shown in FIG. 2A is incorporated into the rendering system 300 to compute pixel colors. In an embodiment, the neural material encoder-decoder system 100 shown in FIG. 2D is incorporated into a rendering system to compute pixel colors. One or more rays may be cast for each pixel. For each ray, a ray traversal unit 310 computes the intersection with the scene. For each segment of a path that terminates at a surface, the neural material encoder-decoder system 200 computes reflectance attributes. A pixel shader 320 combines the reflectance attributes to compute a sample color for each ray that is cast for the pixel. The sample colors may be combined to produce a final color for the pixel. Multiple pixel rendering systems 350 may be used in parallel to compute pixels for an entire image. In an embodiment, rays are cast by a path tracer executing a ray generation shader. In another embodiment, rays are cast by a rasterizer executing a fragment shader or deferred shader. In an embodiment, the neural material encoder-decoder system 200 is a separate software/hardware unit and in other embodiments it is implemented as part of the pixel shader 320. In some embodiments the pixel shader 320 is implemented inside a ray tracing hit shader or ray generation shader.

In an embodiment, the neural material encoder-decoder system 100 or 200 is implemented for execution by a graphics processing unit GPU) using fully fused neural networks. In an embodiment, code generated at runtime for the neural material encoder-decoder system 100 or 200 is evaluated inline with rendering code, allowing for fine-grained execution of the neural material decoder 125 at every hit point in a ray tracing shader program, intermixed with hand-written code.

In an embodiment, the neural materials are trained offline and the runtime system compiles the neural material description into optimized shader code. In the context of the following description, each neural material description comprises the learned hierarchical latent texture and parameters for the associated neural material decoder 125. In an embodiment, one shader module is generated per neural material.

IN an embodiment, GPUs use a single instruction, multiple threads (SIMT) execution model, where batches (wavefronts or warps) of threads execute in lockstep, with each thread operating on its own registers. In a shader, threads may be terminated or masked out due to control flow. Because each thread may process a different hit point and material, there is no guarantee that all threads in a warp evaluate the same neural network (e.g., neural material decoder 125). In an embodiment, two code paths may be generated, optimized for divergent and coherent execution, respectively. The shader selects one of the two code paths dynamically per warp. In the divergent case, the hardware SIMT model is relied on the handle divergence and generate an unrolled sequence of arithmetic and load instructions. A majority of the instructions evaluate the large matrix multiples in the MLP feedforward layers. Fused multiply-add (FMA) instructions may be used to operate on two packed parameters (16-bit weights) at a time. In an embodiment, the parameters are laid out in memory in order of access, and special care is taken to generate 128-bit vectorized loads.

Some recent GPU architectures include hardware units, such as tensor cores for accelerating general matrix multiplication. Matrix multiply-accumulate (MMA) instructions require cooperation across the warp, which limits this fast path to coherent warps where all threads evaluate the same material. Additionally, loading neural network parameters also benefits from coherent access, requiring careful consideration of how to construct coherent warps. Neural materials enable the reproduction of a variety of materials using the same shader code, simply by swapping out material-specific parameters of the neural material decoder 125 and the hierarchical latent texture comprising the material encoder 110. Warp utilization is improved (as well as performance) even for workloads with traditionally high execution divergence, such as path tracing.

However, the increase in data divergence puts pressure on the memory system, and additional performance may be extracted by increasing shading coherence. Conventional coherent approaches like wavefront path tracing store hits to memory and globally reorder the stored hits after each bounce, but the high bandwidth requirements fundamentally limit performance of the wavefront path tracing. Recent hardware features such as shader execution reordering (SER) instead reorder work locally. In an embodiment, a megakernel path tracer is used to keep paths on-chip, and thereby benefit from the increased data coherence provided by SER. In an embodiment, the majority of warps are fully coherent (shading the same material with all threads active) for the megakernel path tracer.

By exposing hardware accelerated tensor operations to ray tracing shaders, it is possible to inline and execute the neural material decoders 125 efficiently inside a real-time path tracer. Multi-layer materials can be learned and all-scale rendering may be performed with prefiltered neural materials. Improved rendering performance may be achieved using code optimized for coherent and divergent execution. A key contribution is an execution model that utilizes tensor operations whenever possible and efficiently handles divergent code paths. Fast inferencing can be achieved in any shader stage including ray tracing and fragment shaders, which is important for adoption in game engines and interactive applications. The neural material encoder-decoder systems 100 and 200 each have a fixed evaluation cost when deployed, independent of the material complexity. The neural material shaders implementing the neural material encoder-decoder systems 100 and 200 can be over an order of magnitude faster than non-neural layered materials, providing opportunities for using film-quality visuals in real-time applications such as games and live previews.

Parallel Processing Architecture

Figure 4:
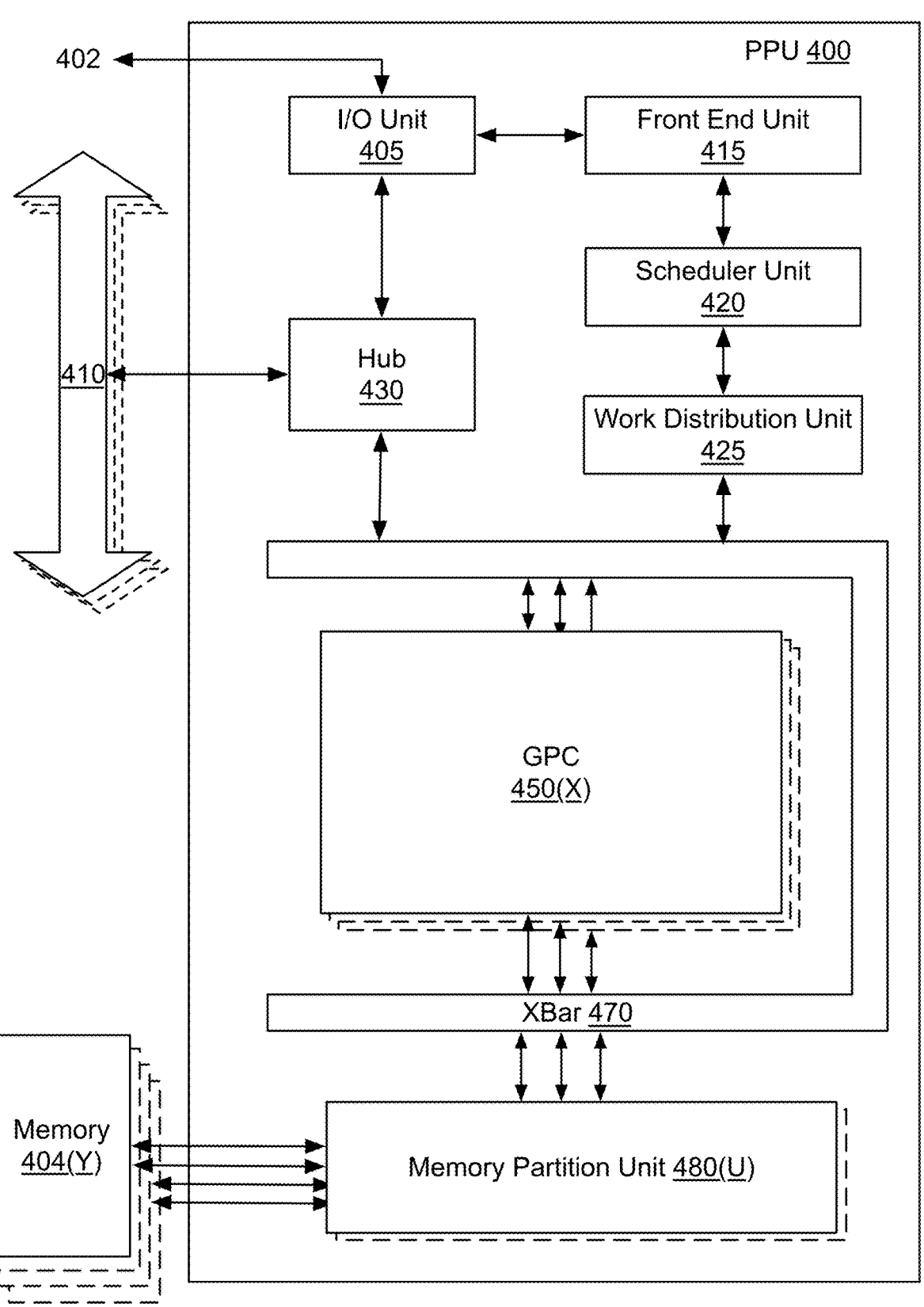
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the real-time neural appearance models. The PPU 400 may be used to implement the neural material encoder-decoder system 100 and/or 200. The PPU 400 may be used to implement one or more of the material encoder 110, transformation unit 120, attribute decoder 130 within the neural material decoder 125 and the outgoing ray sampling decoder 225. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QOS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
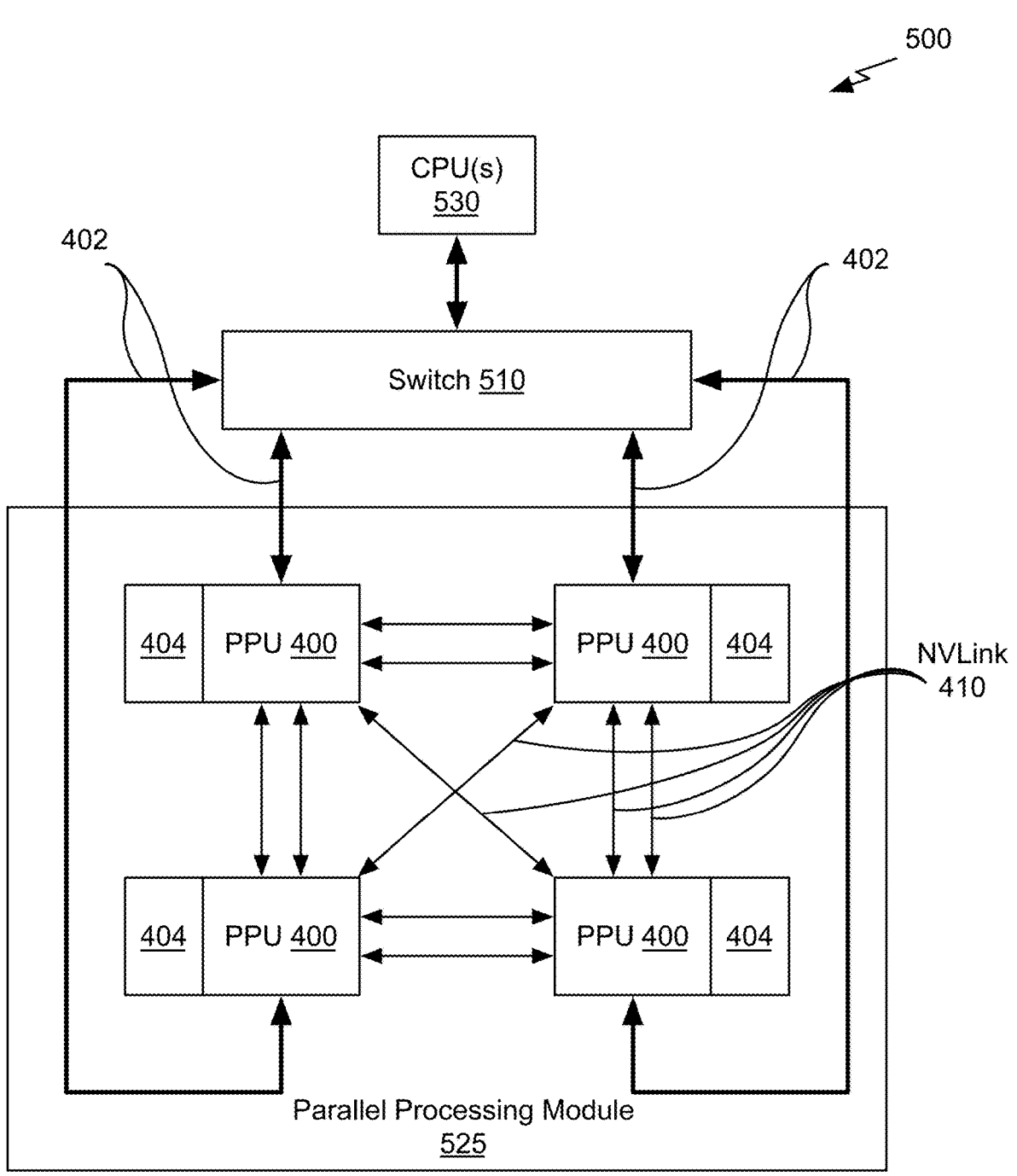
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 565 may be configured to implement the 3D model optimization system 100 and/or a method of real-time neural appearance models, such as the method 240 of FIG. 2B. The processing system 500 includes a CPU 530, switch 510, and multiple PPUs 400, and respective memories 404.

Figure 5B:
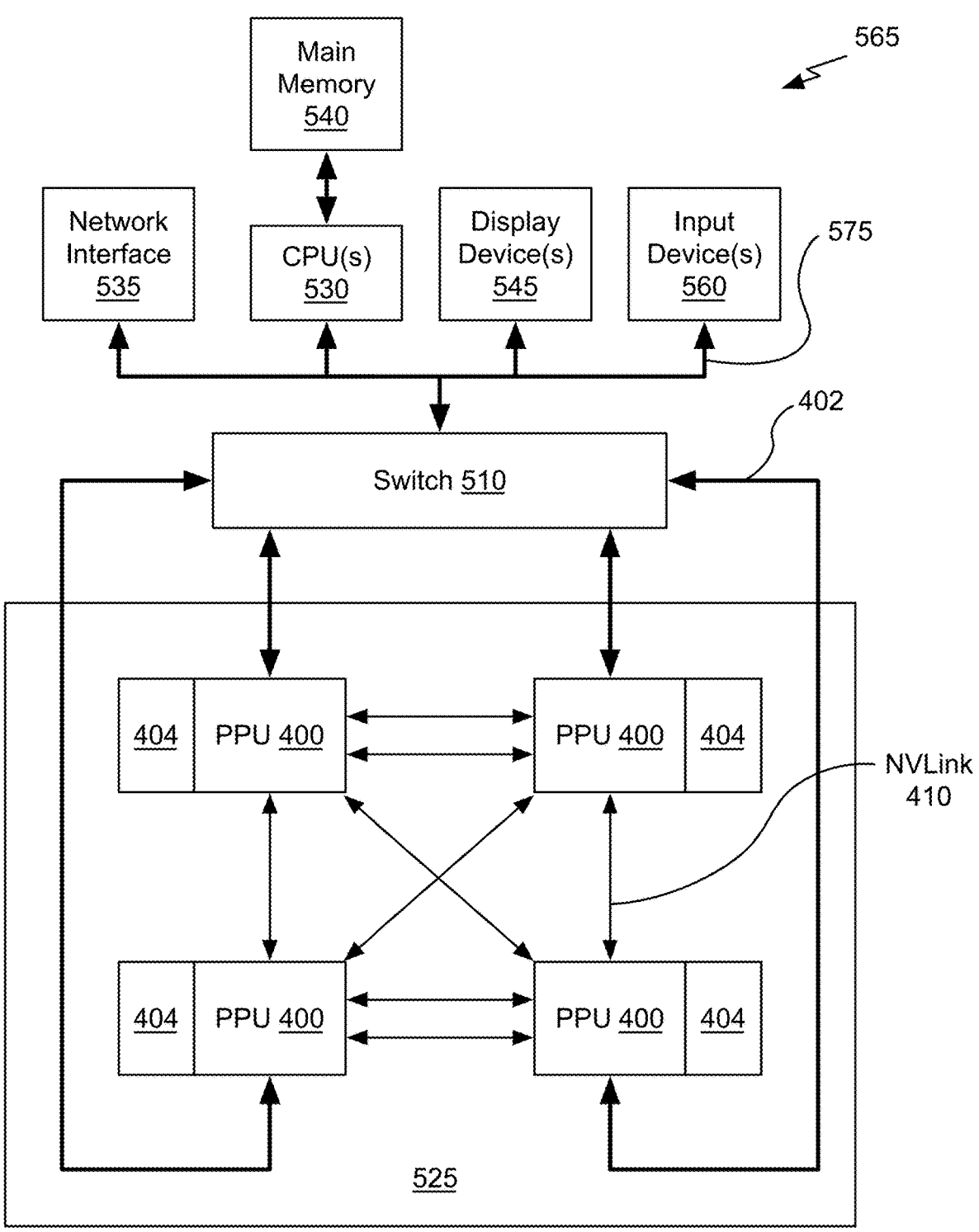
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the 3D model optimization system 100 and/or the method of real-time neural appearance models, such as the method 240 of FIG. 2B.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Figure 5C:
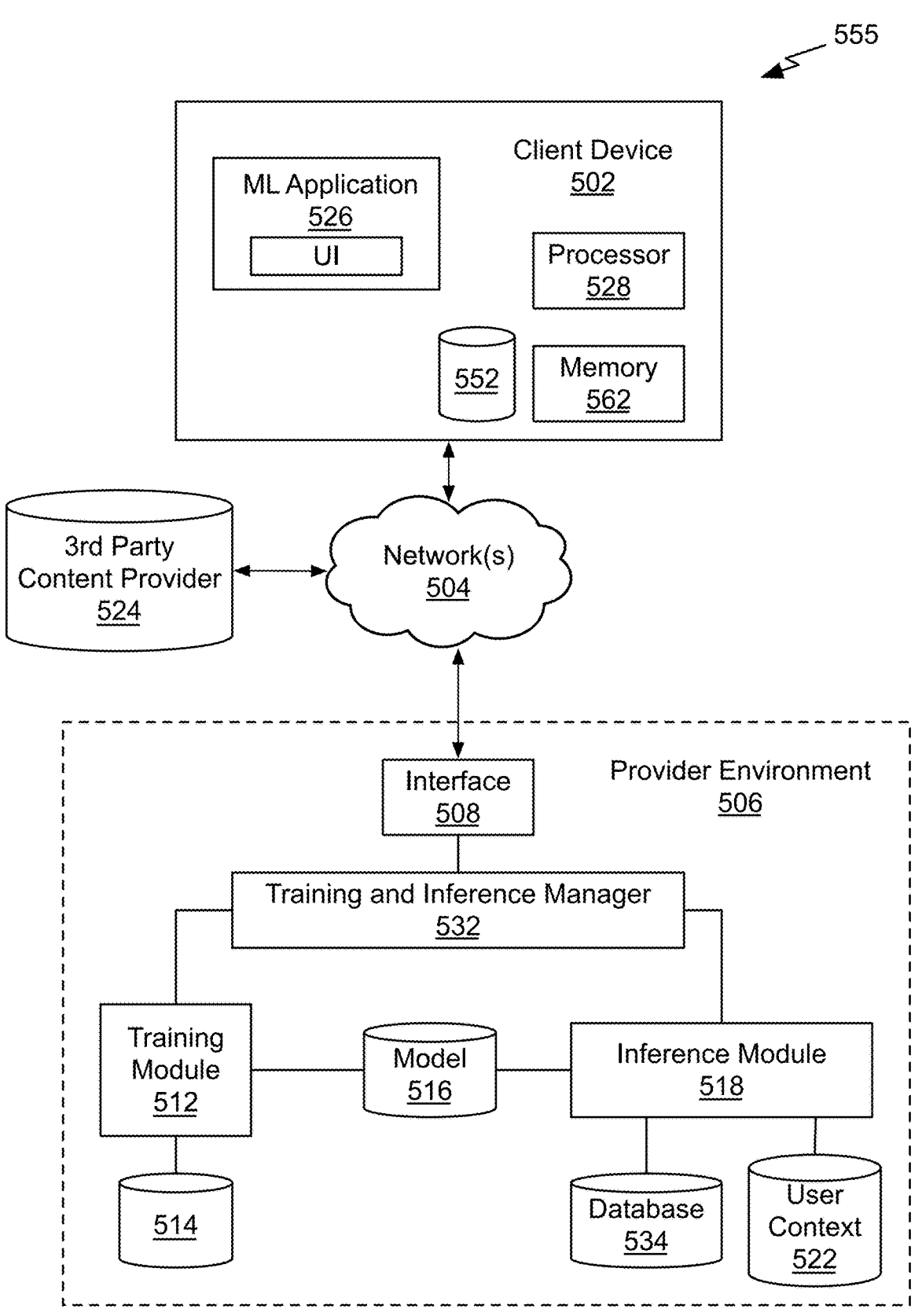
FIG. 5C illustrates components of an exemplary system that can be used to train and utilize machine learning, in at least one embodiment.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA Geforce Now (GFN), Google Stadia, and the like.

Example Streaming System

Figure 6:
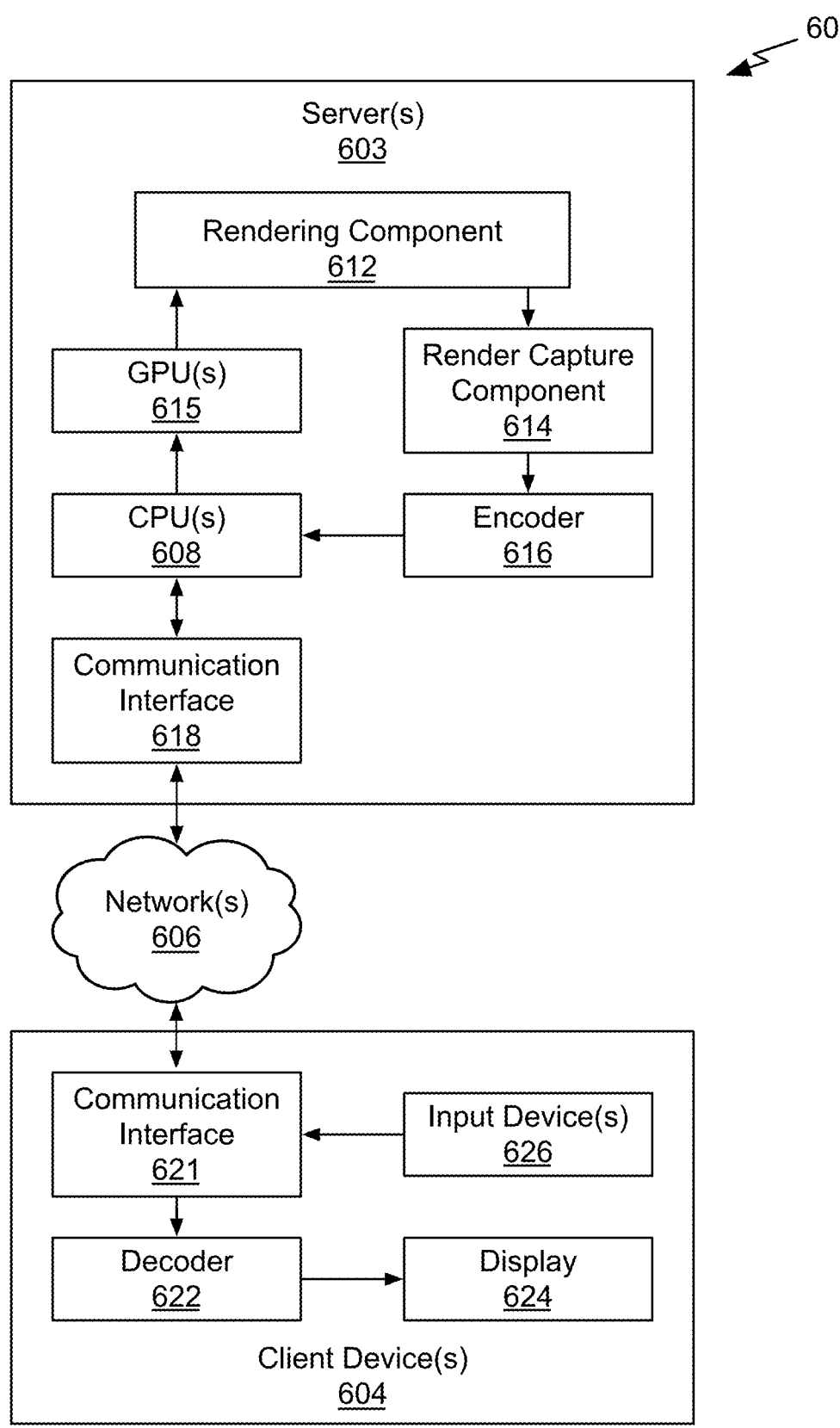
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s), transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs 615, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
receiving a latent code defining properties of a material associated with a surface at a point intersected by a ray;
extracting, from the latent code, at least one property comprising a learned shading frame defining a local orientation of the material;
transforming a surface incident vector and a surface outgoing vector at the point using the at least one extracted property to produce transformed properties; and
predicting, by an attribute decoder neural network, reflectance attributes for the surface based on the latent code and the transformed properties.

2. The computer-implemented method of claim 1, wherein the material comprises at least one layer including one or more of a low-roughness dielectric coating, conductor with glints, or stains.

3. The computer-implemented method of claim 1, further comprising processing the surface incident vector, normal and tangent vectors at the point intersected by the ray, and the latent code by a neural sampling decoder to predict a next segment of a path that includes the ray.

4. The computer-implemented method of claim 1, further comprising predicting directional albedo, directionless albedo, roughness estimation, or transmissivity for the surface based on the latent code and the transformed properties.

5. The computer-implemented method of claim 1, further comprising obtaining the latent code from a stored texture using coordinates of the point.

6. The computer-implemented method of claim 1, further comprising processing, by a material encoder, at least one of coordinates and surface parameters of the point intersected by the ray according to learned parameters to generate the latent code.

7. The computer-implemented method of claim 1, wherein the properties of the material comprise albedo, roughness, a normal vector, and a tangent vector.

8. The computer-implemented method of claim 1, wherein the material comprises at least one volumetric layer.

9. The computer-implemented method of claim 1, wherein matrix operations implemented by the attribute decoder neural network are executed by a tensor core.

10. The computer-implemented method of claim 1, wherein at least one of the steps of receiving, extracting, transforming, or predicting is performed on a server or in a data center to generate an image, and the image is streamed to a user device.

11. The computer-implemented method of claim 1, wherein at least one of the steps of receiving, extracting, transforming, or predicting is performed within a cloud computing environment.

12. The computer-implemented method of claim 1, wherein at least one of the steps of receiving, extracting, transforming, or predicting is performed for training, testing, or certifying a neural network employed in a machine, robot, or autonomous vehicle.

13. The computer-implemented method of claim 1, wherein at least one of the steps of receiving, extracting, transforming, or predicting is performed on a virtual machine comprising a portion of a graphics processing unit.

14. The computer-implemented method of claim 1, wherein the transforming comprises:
constructing a combined transformation matrix based on the learned shading frame; and
computing the transformed properties as a first product of the surface incident vector and the combined transformation matrix and a second product of the surface outgoing vector and the combined transformation matrix.

15. A computer-implemented method, comprising:
processing, by a material encoder, at least one of coordinates and surface parameters of a point intersected by a ray according to learned parameters to generate a latent code defining properties of a material associated with the surface at the point;
extracting, from the latent code, at least one of the properties of the material;
transforming a surface incident vector and a surface outgoing vector at the point using the at least one extracted property to produce transformed properties; and
predicting, by an attribute decoder neural network, reflectance attributes for the surface based on the latent code and the transformed properties, wherein the material encoder is trained by:
determining sample points on the surface;
at each sample point of the sample points, processing the properties of the material, by the material encoder, according to learned parameters to generate estimated latent codes; and
processing the estimated latent codes to predict estimated reflectance attributes at the sample points.

16. The computer-implemented method of claim 15, further comprising adjusting the learned parameters based on differences between the estimated reflectance attributes and reference reflectance attributes.

17. The computer-implemented method of claim 15, further comprising adjusting, based on differences between the estimated reflectance attributes and reference reflectance attributes, decoding parameters that are applied to the estimated latent codes by the attribute decoder neural network to predict the estimated reflectance attributes.

18. A system, comprising:

a memory that stores a surface; and a processor that is connected to the memory, wherein the processor is configured to predict reflectance attributes for the surface by:

receiving a latent code defining properties of a material associated with the surface at a point intersected by a ray;

extracting, from the latent code, at least one property comprising a learned shading frame defining a local orientation of the material;

transforming a surface incident vector and a surface outgoing vector at the point using the at least one extracted property to produce transformed properties; and predicting, by an attribute decoder neural network, the reflectance attributes for the surface based on the latent code and the transformed properties.

19. The system of claim 18, further comprising obtaining the latent code from a stored texture using coordinates of the point.

20. A non-transitory computer-readable medium storing computer instructions that, when executed by one or more processors, cause the one or more processors to perform the steps of:

receiving a latent code defining properties of a material associated with a surface at a point intersected by a ray;

extracting, from the latent code, at least one property comprising a learned shading frame defining a local orientation of the material;

transforming a surface incident vector and a surface outgoing vector at the point using the at least one extracted property to produce transformed properties; and predicting, by an attribute decoder neural network, reflectance attributes for the surface based on the latent code and the transformed properties.

21. The non-transitory computer-readable medium of claim 20, further comprising processing the surface incident vector, normal and tangent vectors at the point intersected by the ray, and the latent code by a neural sampling decoder to predict a next segment of a path that includes the ray.

\* \* \* \* \*